United States Patent
Stojkovic

(10) Patent No.: US 10,150,420 B2
(45) Date of Patent: Dec. 11, 2018

(54) DOORS OFF STORAGE

(71) Applicant: Ford Global Technologies, LLC, Dearborn, MI (US)

(72) Inventor: Dragan B. Stojkovic, Taylor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 111 days.

(21) Appl. No.: 15/465,042

(22) Filed: Mar. 21, 2017

(65) Prior Publication Data
US 2018/0272952 A1 Sep. 27, 2018

(51) Int. Cl.
*B60R 11/06* (2006.01)
*B60R 5/04* (2006.01)

(52) U.S. Cl.
CPC .................... *B60R 5/04* (2013.01)

(58) Field of Classification Search
CPC ..... E05Y 2900/531; B60N 2/20; B62D 25/10; B62D 25/12; E05F 15/63; H05K 7/1497; H05K 7/20745; H05K 7/20836; H05K 7/20736; G06F 1/20
USPC ........................................................ 296/37.1
See application file for complete search history.

(56) References Cited

U.S. PATENT DOCUMENTS

| | | | | |
|---|---|---|---|---|
| 5,584,412 A * | 12/1996 | Wang | ........................ | B60R 7/02 220/500 |
| 5,931,262 A * | 8/1999 | Greenlaw | .............. | B61D 47/00 187/235 |
| 6,050,202 A * | 4/2000 | Thompson | ............. | B60N 3/001 108/144.11 |
| 6,056,177 A * | 5/2000 | Schneider | ................. | B60R 5/04 220/4.28 |
| 6,375,055 B1 * | 4/2002 | Spykerman | ............. | B60R 5/045 108/12 |
| 6,488,168 B1 * | 12/2002 | Wang | ........................ | B60R 7/02 220/6 |
| 6,644,709 B2 * | 11/2003 | Inagaki | ................ | B60N 2/3013 296/37.14 |
| 6,752,304 B1 * | 6/2004 | Hotary | ................... | B60K 37/00 224/544 |
| 9,381,871 B2 * | 7/2016 | Murray | ..................... | B60R 5/04 |
| 9,764,692 B2 * | 9/2017 | Beere | ........................ | B60R 7/08 |
| 9,878,649 B2 * | 1/2018 | Beere | .................... | B60N 3/001 |
| 2003/0090120 A1 * | 5/2003 | Barber | ..................... | B60R 5/04 296/37.5 |
| 2005/0258200 A1 | 11/2005 | Scola | | |
| 2006/0011684 A1 | 1/2006 | Wills | | |
| 2006/0065688 A1 | 3/2006 | Hasz | | |
| 2006/0289578 A1 * | 12/2006 | Beyes | ..................... | B60R 11/00 224/488 |
| 2007/0069542 A1 * | 3/2007 | Steiger | ..................... | B60P 3/14 296/24.44 |
| 2007/0181624 A1 * | 8/2007 | Smith | ...................... | B60R 9/00 224/519 |
| 2008/0012372 A1 * | 1/2008 | Squyres | ................... | B60P 1/00 296/24.44 |

(Continued)

*Primary Examiner* — Kiran B Patel
(74) *Attorney, Agent, or Firm* — Vichit Chea; Price Heneveld LLP

(57) ABSTRACT

A vehicle includes a cargo area. A recessed area is defined within a cargo floor. A door retention system is positioned within the recessed area. A hinge plate includes a hinge retainer. A latch arm includes a latch element. The hinge plate and the latch arm are configured to suspend a vehicle door therebetween.

20 Claims, 6 Drawing Sheets

(56) References Cited

U.S. PATENT DOCUMENTS

| | | | |
|---|---|---|---|
| 2008/0178428 A1* | 7/2008 | McDonald | B60R 7/04 |
| | | | 16/344 |
| 2012/0261938 A1* | 10/2012 | Roach | B60P 7/0892 |
| | | | 296/39.2 |
| 2017/0050579 A1* | 2/2017 | Ranka | B60R 11/06 |
| 2017/0274747 A1* | 9/2017 | Burkhardt | B60J 7/201 |
| 2018/0015882 A1* | 1/2018 | Kim | B60R 5/04 |

* cited by examiner

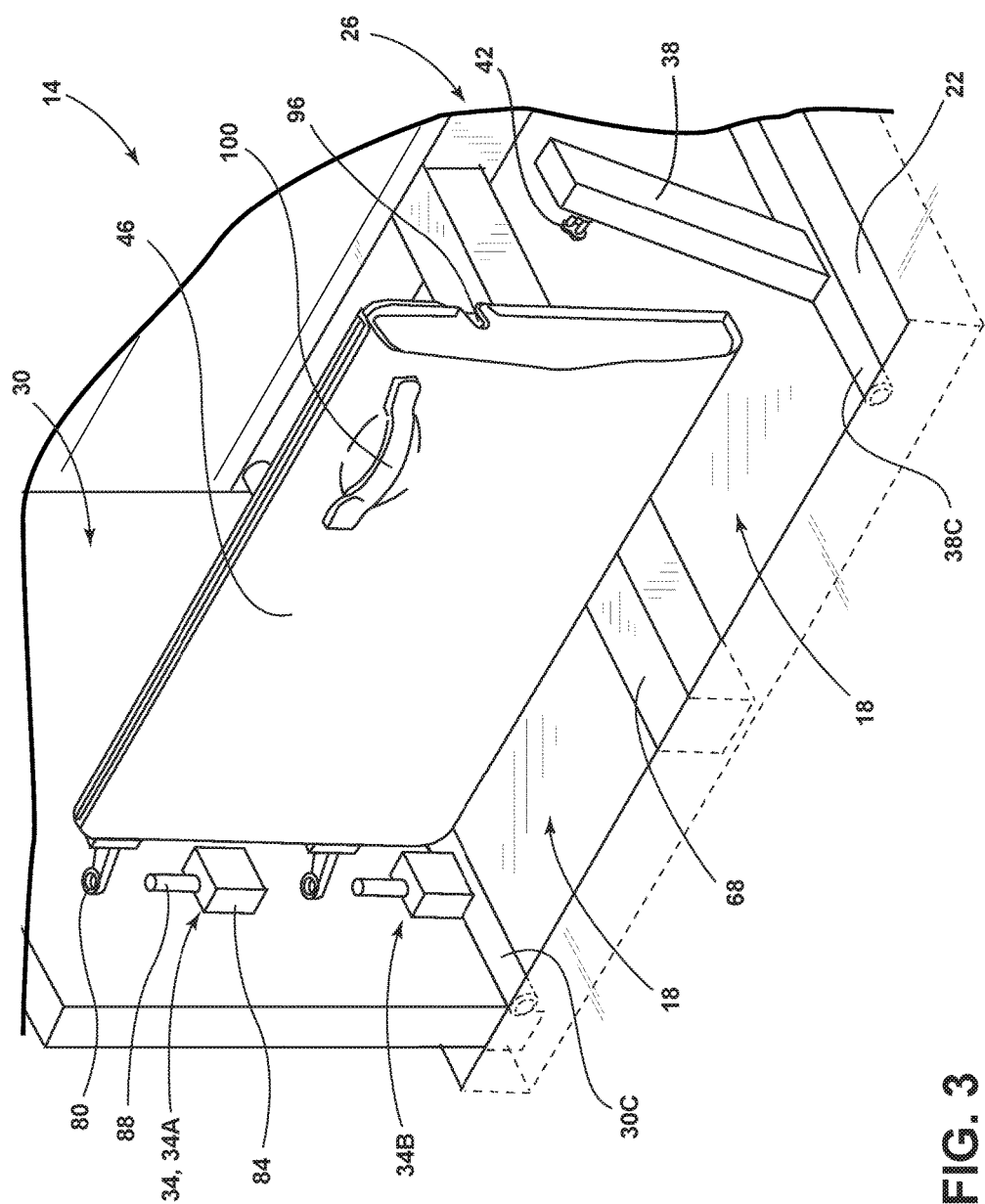

DOORS OFF STORAGE

FIELD OF THE INVENTION

The present disclosure generally relates to vehicle doors, and more particularly, to vehicle door storage.

BACKGROUND OF THE INVENTION

Some vehicles may be transitioned between both doors on and doors off configurations. It therefore may be desirable for the vehicle to store the doors while the vehicle is in the doors off configuration.

SUMMARY OF THE INVENTION

According to one aspect of the present disclosure, a vehicle includes a cargo area. A recessed area is defined within a cargo floor. A door retention system is positioned within the recessed area. A hinge plate includes a hinge retainer. A latch arm includes a latch element. The hinge plate and the latch arm are configured to suspend a vehicle door therebetween.

According to another aspect of the present disclosure, a vehicle includes a recessed area defined within a cargo floor. A door retention system is positioned within the recessed area. A hinge plate includes a hinge retainer. A latch arm includes a latch element. The hinge plate and the latch arm are operable between deployed and undeployed positions and are configured to support a door.

According to yet another aspect of the present disclosure, a vehicle includes a cargo area. A recessed area is defined within a cargo floor. A door retention system is positioned within the recessed area. A hinge plate includes a plurality of hinge retainers positioned across the hinge plate. A latch arm includes a latch element. The hinge plate and the latch arm are configured to suspend a door within the cargo area.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings:

FIG. 3 is a perspective view of a door being inserted into the door retention system, according to at least one example;

DETAILED DESCRIPTION OF THE PREFERRED EMBODIMENTS

Figure 1:
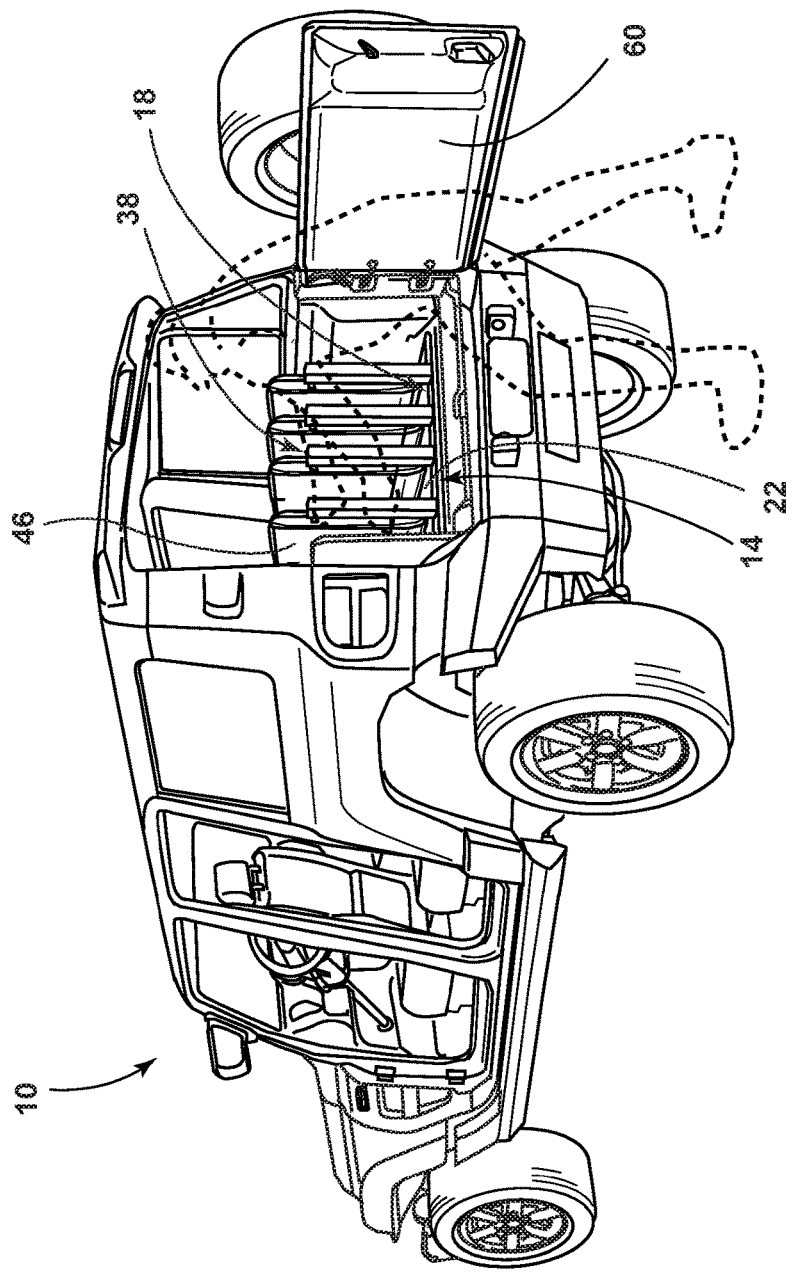
FIG. 1 is a rear perspective view of a vehicle in a "doors off" configuration, according to at least one example.

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

Referring now to FIGS. 1-5, reference numeral 10 generally designates the vehicle. The vehicle 10 includes a cargo area 14. A recessed area 18 is defined within a cargo floor 22 of the cargo area 14. A door retention system 26 is positioned within the recessed area 18. The door retention system 26 includes a hinge plate 30 having a hinge retainer 34. A latch arm 38 includes a latch element 42. The hinge plate 30 and the latch arm 38 are configured to suspend a vehicle door 46 therebetween.

The vehicle 10 is depicted in a "doors off" configuration. The vehicle 10 is capable of operation in both a "doors on" configuration and the doors off configuration. In the doors on configuration, the vehicle 10 includes a plurality of doors 46 (e.g., driver and passenger doors) positioned around the vehicle 10 enclosing an interior, or passenger cabin, of the vehicle 10. The doors 46 are operable between a closed position and an open position. In essence, the vehicle 10 may be operated in a doors on configuration with the doors 46 attached to a frame of the vehicle 10. In the doors off configuration, one or more of the doors 10 may be removed prior to operation (e.g., driving) of the vehicle 10 such that increased ventilation and/or a desired aesthetic appeal of the vehicle 10 is achieved. It will be understood that although the vehicle 10 is depicted as a sport utility vehicle, that the vehicle 10 may equally be a truck, a car, a van or any other vehicle which may benefit from operation without doors.

In the doors off configuration, the doors 46 may be stored within the cargo area 14 of the vehicle 10. The cargo area 14 may be positioned toward a rear of the interior cabin of the vehicle 10. The cargo area 14 may be accessed through a rear door 60. The rear door 60 is operable between open and closed positions. In the open position, the rear door 60 allows the vehicle doors 46 to be moved in and out of the cargo area 14.

Figure 2A:
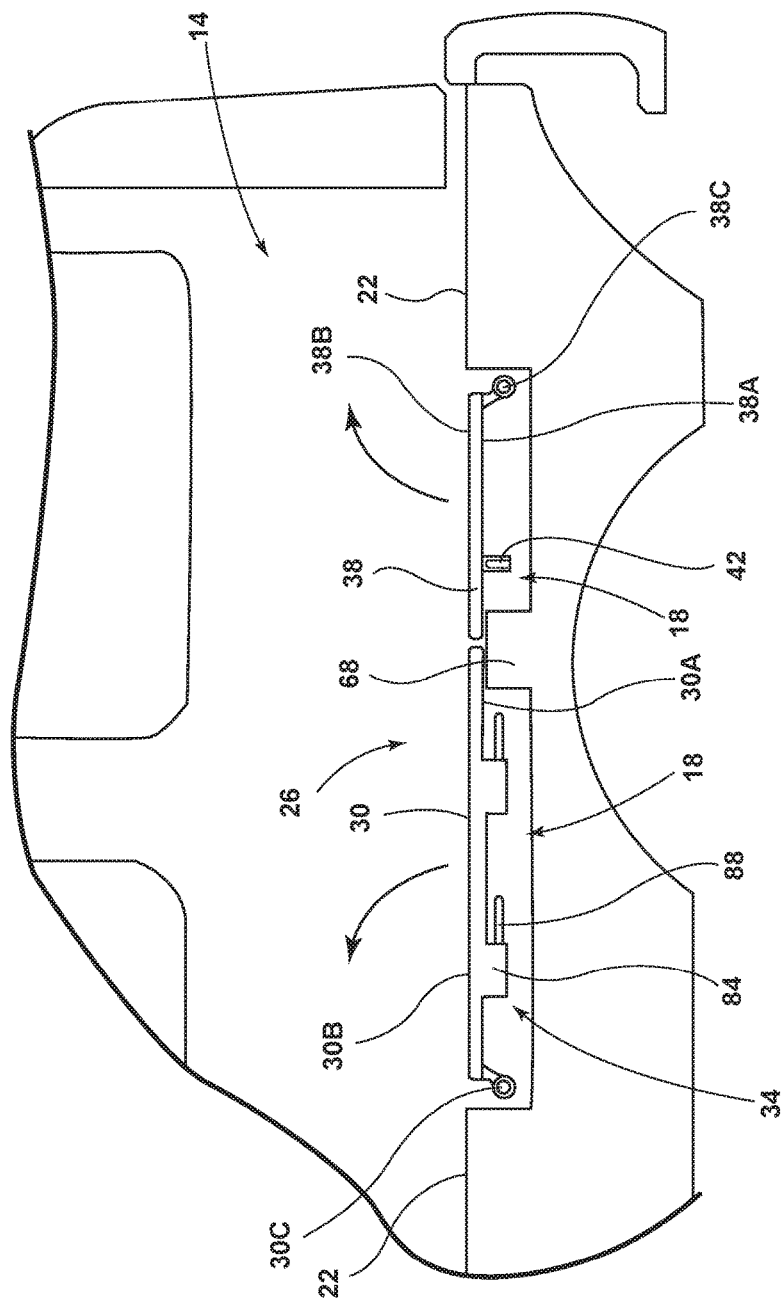
FIG. 2A is a cross-sectional view of a door retention system in an undeployed position, according to at least one example.
Figure 2B:
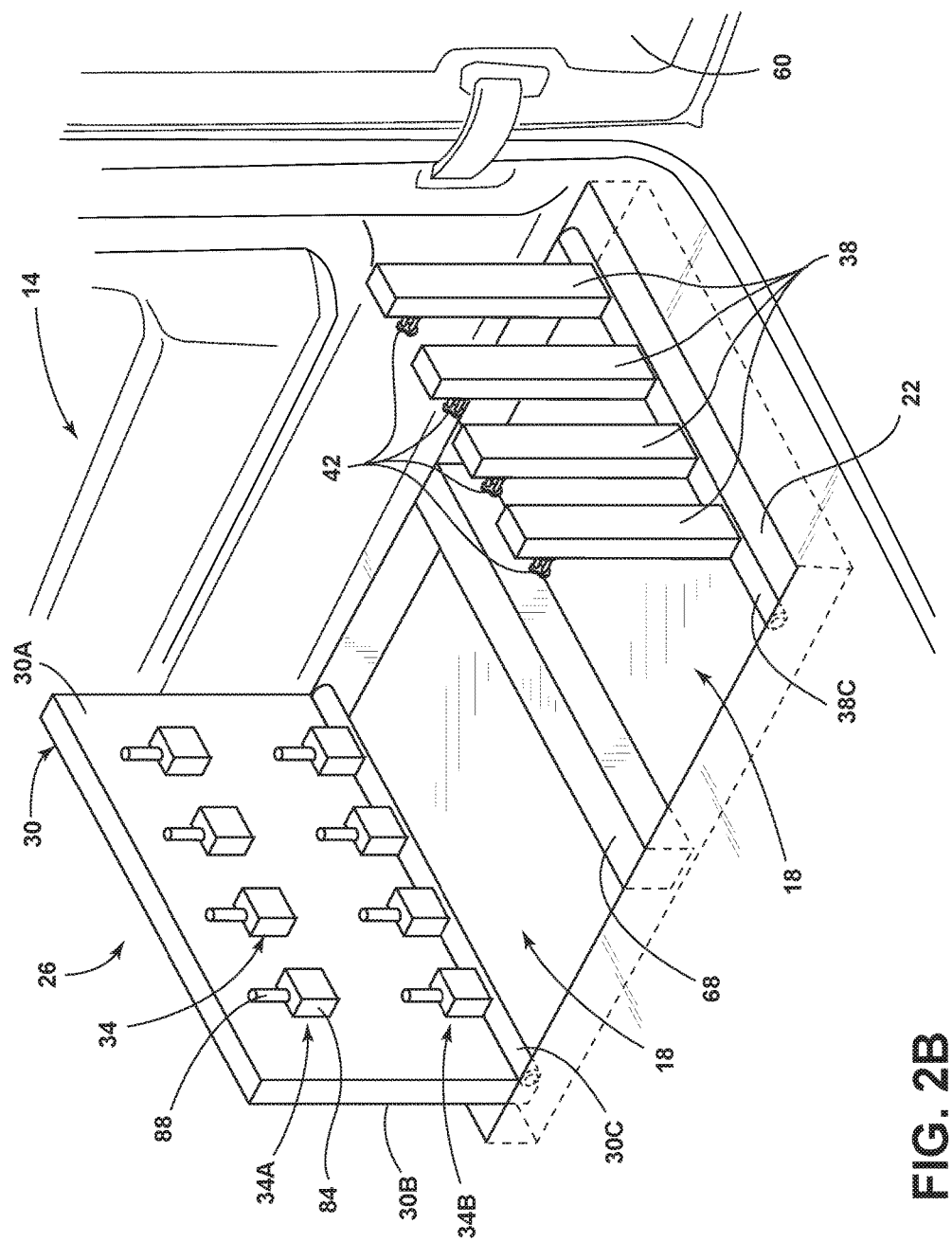
FIG. 2B is a perspective view of the door retention system in a deployed position, according to at least one example.

Referring now to FIGS. 2A and 2B, the door retention system 26 is positioned within the recessed area 18 of the cargo floor 22 of the cargo area 14. In the depicted example, the recessed area 18 may include a divider 68. The divider 68 may have a height less than or equal to that of the recessed area 18. In other words, a top surface of the divider 68 may be flush with the cargo floor 22 or below it. The divider 68 is depicted as a single continuous structure, but may be a plurality of separate structures each having a different size or height. In operation, the divider 68 may function to support the hinge plate 30 and/or the latch arms 38. For example, the divider 68 may be positioned low enough within the recessed area 18 that while the hinge plate 30 and/or the latch arms 38 are in the undeployed position, rear surfaces of the hinge plate 30 and/or latch arms 38 may be substantially flush with the cargo floor 22. The divider 68 may define one or more coupling features to attach and/or retain the hinge plate 30 and the latch arms 38 to the divider 68. For example, the divider 68 may include magnets, straps, detents and/or other features configured to engage the hinge plate 30 and/or the latch arms 38. It will be understood that examples of the door retention system 26 including a coupling feature within the divider 68 may also include a release feature (e.g., a switch, lever, button, etc.) which may deactivate the coupling feature.

The door retention system 26 includes both the hinge plate 30 and the latch arms 38. In the depicted example, the hinge plate 30 is a single continuous structure, but it will be understood that the hinge plate 30 may be discontinuous or may be formed of a plurality of structures similar to that of the latch arms 38. The hinge plate 30 is depicted as positioned vehicle forward of the latch arms 38, but it will be understood that the latch arms 38 may be positioned vehicle forward of the hinge plate 30. The hinge plate 30 may be composed of a metal, polymer and/or combinations thereof. The hinge plate 30 may have a width substantially equal to that of the recessed area 18 such that a portion of the recessed area 18 is covered while the hinge plate 30 is in the undeployed position. The hinge plate 30 defines a hinge face surface 30A and a hinge rear surface 30B. As explained above, the hinge rear surface 30B may be substantially flush with the cargo floor 22 while the hinge plate 30 is in the undeployed position. It will be understood that the hinge rear surface 30B may be positioned below or above the cargo floor 22 without departing from the teachings provided herein. Further, one or more doors and/or flaps may conceal the recessed area such that the hinge plate 30 and/or the latch arms 38 are not visible. Even further, the recessed area 18 may extend deep enough and/or the hinge plate 30 and latch arms 38 are positioned high enough that items may be stowed within the recessed area 18.

One or more hinge retainers 34 may be positioned on the plate face surface 30A. In the depicted example, there is a plurality of hinge retainers 34 disposed across the hinge face surface 30A. In the depicted example, the hinge retainers 34 may be characterized as upper hinge retainers 34A and lower hinge retainers 34B. In other words, the hinge plate 30 includes an upper and a lower hinge retainer 34A, 34B. It will be understood that the hinge plate 30 may include only the upper hinge retainers 34A and/or the lower hinge retainers 34B. The hinge retainers 34 are positioned sufficiently far from a top the hinge plate 30 that the hinge plate 30 may contact the divider 68 without interference. The hinge retainers 34 may be positioned in straight rows, or the hinge retainers 34 may be positioned at varying heights across the hinge plate 30. The hinge retainers 34 may be positioned at varying heights across the hinge plate 30 based on differences in the location of hinges 80 from door 46 to door 46. For example, the hinges 80 of the front doors 46 may be spaced differently than hinges 80 of the rear doors 46. Accordingly, the hinge retainers 34 may be placed in a variety of locations to accommodate differently designed doors 46. The hinge retainers 34 may be integrally defined by the hinge plate 30, or may be separate structures. In examples where the hinge retainers 34 are separate structures from the hinge plate 30, the hinge retainers 34 may be removably coupled to the hinge plate 30. In other words, a user may be able to remove and/or rearrange the hinge retainers 34.

In operation, the hinge retainers 34 are configured to couple to hinges 80 of the vehicle door 46. Each of the hinge retainers 34 may include a base 84 and a post 88. The base 84 is coupled to the hinge face surface 30A of the hinge plate 30. The post 88 extends from the base 84 in a substantially vertical direction while the hinge plate 30 is in the deployed position. The posts 88 are configured to slide through the hinges 80 such that the door 46 is retained by the hinge plate 30. The hinges 80 of the door 46 may engage both the upper and lower hinge retainers 34A, 34B. According to various examples, the hinge retainers 34 may include one or more coupling features configured to secure the hinges 80 of the vehicle doors 46 to the hinge retainers 34. For example, the optional coupling features may include a strap, a detent, a locking feature and/or other coupling features configured to retain the vehicle hinge 80 on the post 88. In yet other examples, the posts 88 may be of such a length that the movement of the hinges 80 off of the posts is unlikely.

The door retention system 26 includes one or a plurality of latch arms 38. The latch arms 38 define a latch front face 38A and a latch rear face 38B. In the depicted example, the door retention system 26 includes four latch arms 38, but it will be understood that the door retention system 26 may include less than or greater than four latch arms 38. The latch arms 38 are coupled to an opposite side of the recessed area 18 than the hinge plate 30. The latch arms 38 may be independently movable from one another or the latch arms 38 may move in unison. In other words, the latch arms 38 may independently be rotated between the undeployed and deployed positions. The latch arms 38 are positioned vehicle rearward of the hinge plate 30. The latch arms 38 include latch elements 42 configured to engage a door latch 96 of the vehicle door 46. The latch elements 42 are positioned on the latch front face 38A. The latch elements 42 may be movable up and down on the latch arms 38 as well as rotatable around the latch arm 38. Further, the latch elements 42 may be removed and reattached to the latch arms 38. The latch elements 42 may have a generally U-shaped structure similar to latches present on door sills of the vehicle 10 which are configured to engage the latches 96 of the vehicle doors 46. In yet other examples, the latch elements 42 may be posts or other structures configured to engage the vehicle door latches 96. The latch arms 38 may be shorter or longer than the hinge plate 30.

The hinge plate 30 and the latch arm 38 are operable between deployed (FIG. 2B) and undeployed (FIG. 2A) positions. The hinge plate 30 is coupled to the cargo floor 22 through a hinge pivot 30C and the latch arm 38 is coupled to the cargo floor though a latch pivot 38C. The hinge and latch pivots 30C, 38C are configured to allow the hinge plate 30 and the latch arm 38 to rotate into, and out of, the recessed area 18, respectively. In other words, the hinge and latch pivots 30C, 38C are configured to allow the hinge plate 30 and the latch arm 38 to rotate between the deployed and undeployed positions. In the undeployed position, the hinge face surface 30A of the hinge plate 30 and the latch front face 38A face in an inward direction into the recessed area 18. As such, the hinge retainers 34 and the latch elements 42 may be concealed within the recessed area 18 while the door retaining system 26 is in the undeployed position. Further, as explained above, the hinge rear surface 30B and the latch rear face 38B are substantially flush with the cargo floor 22 while the door retaining system 26 is in the undeployed position.

In the deployed position, the door retaining system 26 is configured to support and retain the vehicle doors 46. The hinge plate 30 and/or hinge pivot 30C may include or be coupled to a locking feature which locks the hinge plate 30 in place. The hinge plate 30 and the latch arm 38 are substantially vertical in the deployed position. The hinge and latch pivots 30C, 38C may allow the hinge plate 30 and the latch arms 38 to rotate to a substantially flat positioned against the cargo floor 22. In other words, the hinge plate 30 and the latch arms 38 may rotate up to about 180° from the undeployed position. While in the deployed position, the latch elements 42 may extend substantially parallel to the cargo floor 22 and the posts 88 may be substantially perpendicular to the cargo floor 22. Allowing the hinge plate 30 and the latch arms 38 to rotate up to 180° from the deployed position may ease the insertion and coupling of the doors 46 into the door retaining system 26.

Figure 4:
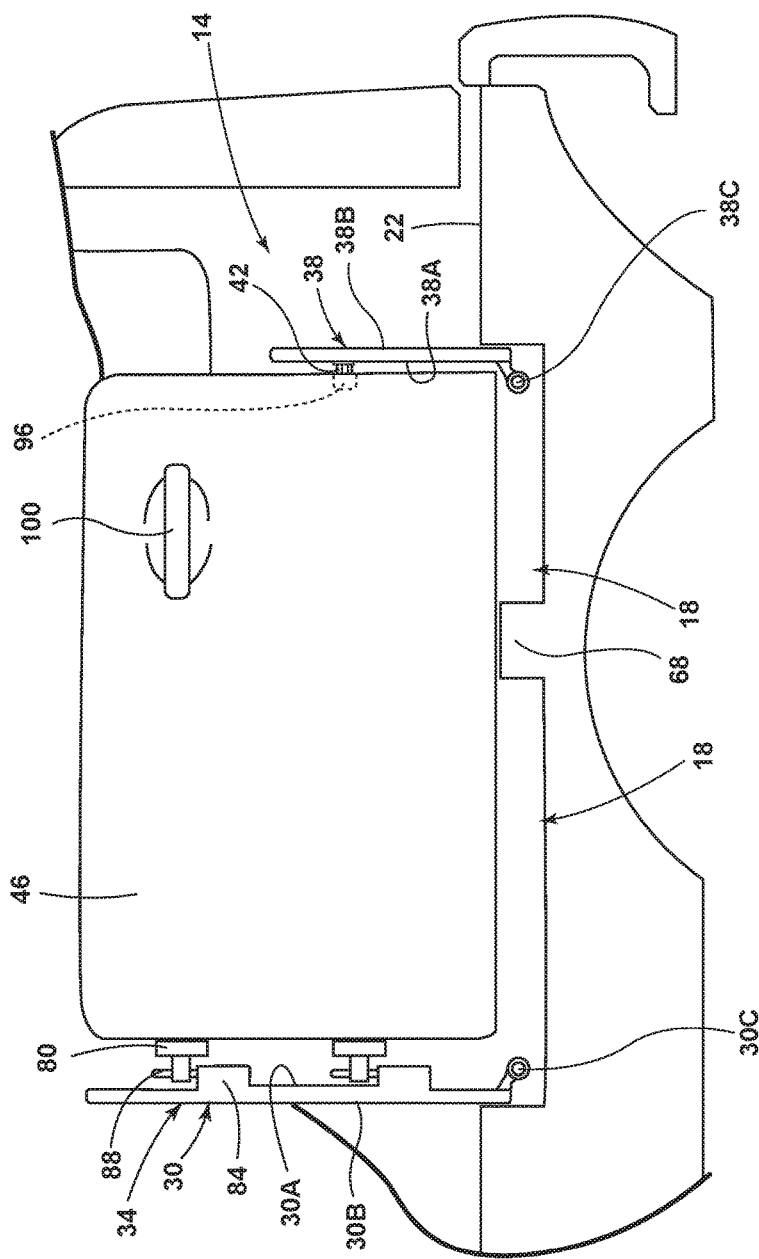
FIG. 4 is a cross-sectional view of a door retention system in a deployed position, according to at least one example.
Figure 5:
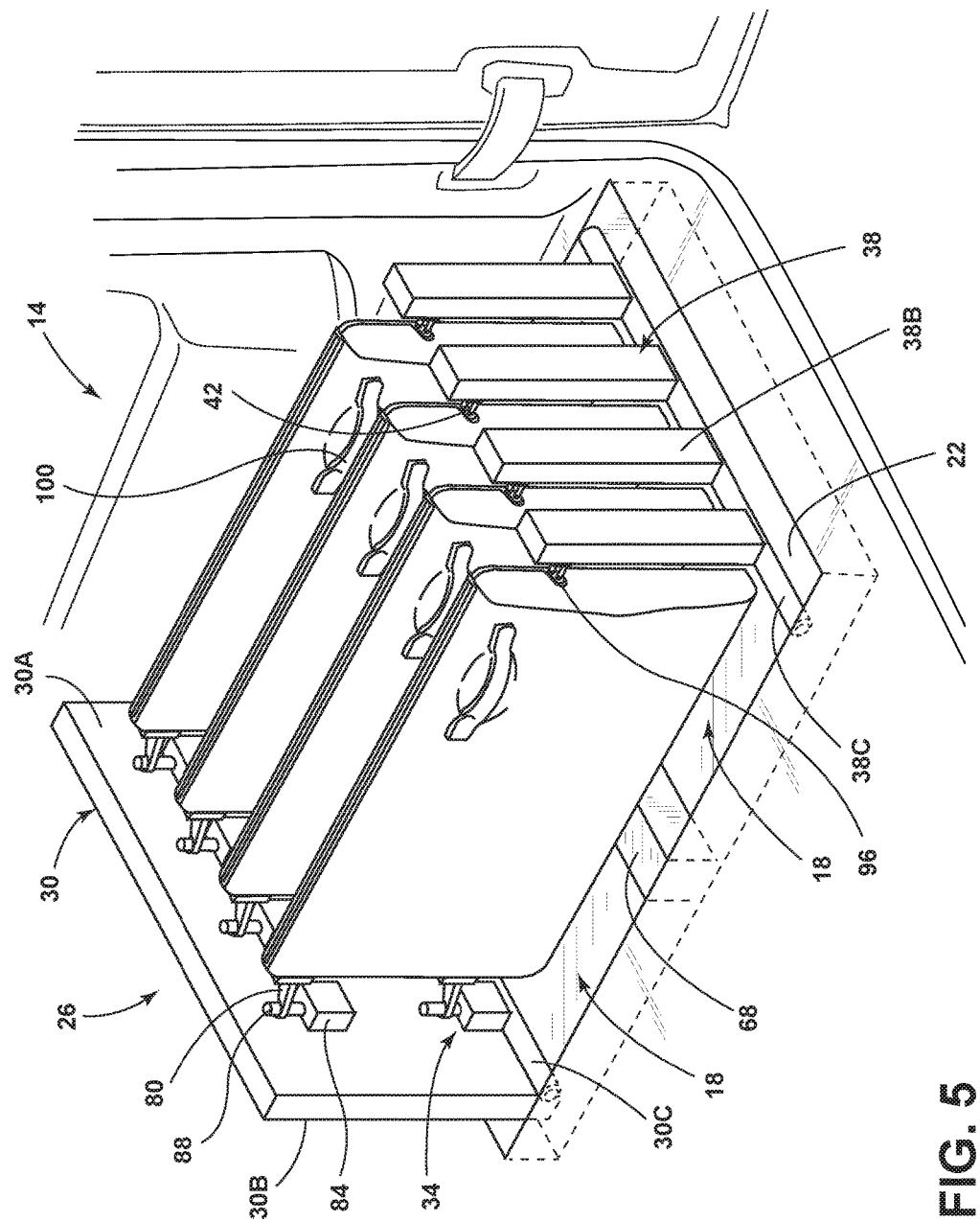
FIG. 5 is a perspective view of a plurality of doors retained in the door retention system, according to at least one example.

Referring now to FIGS. 3-5, the door retaining system 26 is configured to support one or more vehicle doors 46 within the cargo area 14. The hinge plate 30 and the latch arm 38 are configured to suspend, and/or hang, the vehicle door 46 within the cargo area 14 and above the recessed area 18. It will be understood that the terms suspend and/or hang may still be applicable in examples where one or more of the doors 46 are at least partially supported by the divider 68. In the depicted example, the door retaining system 26 supports the doors 46 vertically and in a vehicle forward and rearward direction, but it will be understood that the door retaining system 26 may suspend the doors 46 in a passenger side to driver side manner. Further, the door retaining system 26 may be reoriented such that the doors 46 may be stored horizontally (e.g., the door retaining system may be positioned in a wall of the vehicle 10) without departing from the teachings provided herein.

According to at least one exemplary door retaining process, a first step of removing the doors 46 from the vehicle 10 may be performed. Next, the door may be placed proximate the cargo area 14 (e.g., within the cargo area 14 and/or outside of the vehicle 10 on the ground by the rear door 60). Next, the hinge plate 30 may be moved from the undeployed position within the recessed area 18 to the deployed position. In one example, a user of the door retaining system 26 may manually lift the hinge plate 30. In another example, the hinge plate 30 may be mechanically actuated between the undeployed and deployed positions. It will be understood that the latch arm 38 may be moved to the deployed position at this time as well. Once the hinge plate 30 has been deployed, the doors 46 may be loaded into the door retaining system 26 one at a time. The hinges 80 of the doors 46 are placed over the posts 88 of the hinge retainers 34. In examples where the hinge plate 30 includes both the upper and lower hinge retainers 34A, 34B, the hinges 80 may be slid over both. The hinges 80 are slid down over the posts 88 and seated on the bases 84 of the hinge retainers 34. At this point, the optional coupling feature may be engaged. After the hinges 80 of the door 46 are secured on the hinge retainers 34, the latch element 42 of the latch arm 38 may be engaged to the latch 96 of the door 46. A user may press the latch element 42 into the latch 96 and/or may rotate the door 46 to couple the latch 96 to the latch element 42. The process may be repeated to fill the door retention system 26.

Once the user desires to remove the doors 46 from the door retention system 26, the door 46 may be decoupled from the door retention system 26 by actuating a handle 100 of the door 46. Actuating the handle 100 may serve to decouple the latch element 42 from the door latch 96. Once the latch element 42 is removed, the latch arm 38 may be moved toward the cargo floor 22 such that the hinges 80 of the door 46 can be lifted off of the posts 88. Once the hinges 80 of the door 46 are removed from the posts 88, the door 46 can be removed from the cargo area 14 and reattached to the vehicle 10.

Use of the present disclosure may offer a variety of advantages. First, flush alignment of the hinge plate 30 and the latch arm 38 in the undeployed position allows for a greater storage capacity of cargo within the cargo area 14 while the door retention system 26 is not in use. Second, positioning of the hinge retainers 34 and latch elements 42 on the hinge face surface 30A and the latch front face 38A, respectively, allows for the hinge retainers 34 and latch elements 42 to remain concealed within the recessed area 18 and not interfere with cargo in the cargo area 14. Third, in examples where the hinge plate 30 is a solid plate, the recessed area 18 may be covered or substantially covered which may provide concealed storage which may increase the amount of cargo the vehicle 10 may carry.

According to various examples, a vehicle includes a cargo area, a recessed area defined within a cargo floor and a door retention system positioned within the recessed area. The door retention system includes a hinge plate including a hinge retainer and a latch arm including a latch element. The hinge plate and the latch arm are configured to suspend a vehicle door therebetween. Examples of the vehicle can include any one or a combination of the following features:
the hinge retainers are configured to couple to a hinge of the vehicle door;
the latch element is configured engage a latch of the vehicle door;
the door retention system comprises a plurality of latch arms;
the hinge plate comprises an upper and a lower hinge retainer;
a pivot hinge coupling the hinge plate to the cargo floor;
the hinge plate is positioned vehicle forward of the latch arm;
the hinge plate and the latch arm are operable between deployed and undeployed positions;
the hinge plate and latch arm are substantially vertical in the deployed position;
a rear surface of the hinge plate is flush with the cargo floor in the undeployed position; and/or
a rear surface of latch arm is flush with cargo floor in the undeployed position.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

It will be apparent to those skilled in the art that various modifications and variations can be made to the present disclosure without departing from the spirit and scope of the disclosure. Thus, it is intended that the present disclosure cover such modifications and variations provided they come within the scope of the appended claims and their equivalents. Example embodiments include the following.

What is claimed is:

1. A vehicle, comprising:
   a cargo area;
   a recessed area defined within a cargo floor; and
   a door retention system positioned within the recessed area comprising:
      a hinge plate comprising a hinge retainer; and
      a latch arm comprising a latch element, wherein the hinge plate and the latch arm are configured to suspend a vehicle door therebetween.

2. The vehicle of claim 1, wherein the hinge plate and the latch arm are operable between deployed and undeployed positions.

3. The vehicle of claim 2, wherein the hinge plate and latch arm are substantially vertical in the deployed position.

4. The vehicle of claim 2, wherein a rear surface of the hinge plate is flush with the cargo floor in the undeployed position.

5. The vehicle of claim 2, wherein a rear surface of latch arm is flush with cargo floor in the undeployed position.

6. The vehicle of claim 1, wherein the hinge retainers are configured to couple to a hinge of the vehicle door.

7. The vehicle of claim 1, wherein the latch element is configured engage a latch of the vehicle door.

8. The vehicle of claim 1, wherein the door retention system comprises a plurality of latch arms.

9. The vehicle of claim 1, wherein the hinge plate comprises an upper and a lower hinge retainer.

10. The vehicle of claim 1, further comprising:
    a pivot hinge coupling the hinge plate to the cargo floor.

11. The vehicle of claim 1, wherein the hinge plate is positioned vehicle forward of the latch arm.

12. A vehicle, comprising:
    a recessed area defined within a cargo floor; and
    a door retention system positioned within the recessed area comprising:
       a hinge plate comprising a hinge retainer; and
       a latch arm comprising a latch element, wherein the hinge plate and the latch arm are operable between deployed and undeployed positions and are configured to support a door.

13. The vehicle of claim 12, wherein the recessed area comprises a divider configured to support the door retention system.

14. The vehicle of claim 12, wherein a rear surface of the hinge plate is flush with the cargo floor in undeployed position.

15. The vehicle of claim 12, wherein a rear surface of latch arm is flush with cargo floor in undeployed position.

16. A vehicle, comprising:
    a cargo area;
    a recessed area defined within a cargo floor; and
    a door retention system positioned within the recessed area comprising:
       a hinge plate comprising a plurality of hinge retainers positioned across the hinge plate; and
       a latch arm comprising a latch element, wherein the hinge plate and the latch arm are configured to suspend a door within the cargo area.

17. The vehicle of claim 16, wherein the hinge plate is positioned vehicle forward of the latch arm.

18. The vehicle of claim 16, wherein the door retention system comprises a plurality of latch arms.

19. The vehicle of claim 16, wherein the hinge retainers are configured to couple to a hinge of the vehicle door.

20. The vehicle of claim 16, wherein the latch element is configured engage a latch of the vehicle door.

* * * * *

UNITED STATES PATENT AND TRADEMARK OFFICE
CERTIFICATE OF CORRECTION

PATENT NO. : 10,150,420 B2
APPLICATION NO. : 15/465042
DATED : December 11, 2018
INVENTOR(S) : Stojkovic Page 1 of 1

It is certified that error appears in the above-identified patent and that said Letters Patent is hereby corrected as shown below:

In the Claims

Column 8:
Claim 5, Line 4;
After "of" insert --the--. (Second Occurrence)
Claim 5, Line 5;
After "with" insert --the--.
Claim 7, Line 9;
After "configured" insert --to--.
Claim 14, Line 31;
After "in" insert --the--.
Claim 15, Line 33;
After "of" insert --the--. (Second Occurrence)
Claim 15, Line 34;
After "with" insert --the--.
Claim 15, Line 34;
After "floor in" insert --the--.
Claim 20, Line 52;
After "configured" insert --to--.

Signed and Sealed this
Fifth Day of March, 2019

Andrei Iancu
*Director of the United States Patent and Trademark Office*